United States Patent [19]

Kniest et al.

[11] Patent Number: 4,823,590
[45] Date of Patent: Apr. 25, 1989

[54] AUTOMATIC CALIBRATION METHOD FOR THICKNESS GAUGES

[75] Inventors: James N. Kniest, Edmonds; Dean D. Campbell, Seattle, both of Wash.

[73] Assignee: Ultrasonic Arrays, Inc., Woodinville, Wash.

[21] Appl. No.: 104,420

[22] Filed: Oct. 2, 1987

[51] Int. Cl.⁴ ............................................ G01N 29/00
[52] U.S. Cl. ...................................... 73/1 J; 73/1 DV
[58] Field of Search ...................... 73/1 J, 1 DV, 597; 367/13, 99, 107; 209/590, 524, 536; 364/571, 563

[56]   References Cited
   U.S. PATENT DOCUMENTS

| | | | |
|---|---|---|---|
| 2,635,746 | 4/1953 | Gordon | 209/590 |
| 3,844,163 | 10/1974 | Di Leo | 73/597 |
| 4,437,332 | 3/1984 | Pittaro | 73/1 DV |
| 4,567,747 | 2/1986 | Matay | 73/598 |
| 4,569,037 | 2/1986 | Seiferling | 367/13 |
| 4,624,127 | 11/1986 | Naroshima et al. | 73/1 DV |

Primary Examiner—Michael J. Tokar
Assistant Examiner—Robert R. Raevis
Attorney, Agent, or Firm—Flehr, Hohbach, Test, Albritton & Herbert

[57]          ABSTRACT

A method for calibrating a thickness measuring system that automatically compensates for inadvertent movements of the probe. In one embodiment, a conventional thickness measuring system is provided that incorporates a pair of spaced apart opposing ultrasonic sensors that are positioning a known distance apart. A target is passed between the sensors and the distance from each sensor to the target is measured. The thickness of the target can be determined by subtracting the distance from each sensor to the target from the known distance between the targets. The improvement, being a method of periodically checking the distance between the sensors to compensate for movements of the sensor relative to each other due to such effects as thermal expansion or inadvertent movements. The automatic compensation technique can be applied to a single probe system as well.

20 Claims, 3 Drawing Sheets

… … …

AUTOMATIC CALIBRATION METHOD FOR THICKNESS GAUGES

BACKGROUND OF THE INVENTION

The present invention relates generally to a calibration method for calibrating dimensional measuring probes. More particularly, the calibration method eliminates errors that are caused by inadvertent movement of the gauges.

Ultrasonic dimensional measuring probes are frequently used to measure the thickness of a target, or a precise distance between components. These range finders have been applied to such diverse areas as gauging thickness of cold rolled steel, positioning parts for robotic assembly, sorting parts by thickness, determining the liquid levels in containers, and picking out cross threaded caps on bottles. At times, the measurements must be accurate to within ±0.002 inch for thickness and ±0.001 inch for distance. However, movement of the sensor relative to the target surface and/or movement of a pair of opposing sensors relative to one another can introduce errors in the measured target thickness. The problem can be reduced somewhat by rigidly mounting the probes. However, such mounting is not always possible, and even with extremely rigid fixturing, ambient temperature changes can cause movements of 0.010 inches or more. Such movements typically result in corresponding errors in the thickness measurements. Therefore, there is a need for an ultrasonic ranging system capable of compensating for relative movements between either a pair of spaced apart sensors, or a sensor and a reference position.

SUMMARY OF THE INVENTION

Therefore, it is a primary objective of the present invention to provide a method for automatically calibrating a dimensional measuring system.

Another object of the present invention is to provide a thickness measuring system that periodically checks the separation between a pair of spaced apart ultrasonic gauges.

An alternative object of the present invention is to provide a distance measuring system that periodically checks the separation between an ultrasonic gauge and a reference position.

To achieve the foregoing and other objects and in accordance with the purpose of the present invention, a method for calibrating a dimensional measuring system is disclosed that incorporates at least one distance measuring sensor. The gauge is adapted to periodically generate signals that are directed towards a reference region through which a target may be passed. The calibration method is intended to automatically compensate for inadvertent movements of the sensor. At any time before a signal is generated, the system has an estimated separation which corresponds to the distance the signal is expected to travel before reception if no target is present. When a particular signal is emitted, a timer is started to measure the time period that elapses before the signal is received at a designated location. If a target is present, or if potential targets are placed on a platform, or a conveyor that will reflect the signal, then the signal will be received by the sensor that emitted it. If, however, a pair of opposing distance measuring sensors are used, with potential targets being passed therebetween for measurements, and no target is present, then the signal will be received by the opposing sensor. From the time period measured between generation and reception of the signal, the distance the signal traveled can be calculated. If a target is present when a particular signal is generated, the thickness of the target is calculated by conventional techniques such as subtracting the measured distance the signal traveled (or the combined travel of both signals in the event of an opposing sensor construction) from the estimated separation. If no target is present when the signal is generated, then the time period measured between generation and reception of the signal is used to update the estimated separation to compensate for inadvertent movements of the gauge(s).

Preferably, the target thickness and the updated separation calculations are both functions of the distance traveled by the signal (measured time period) and the existing estimated separation.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

DETAILED DESCRIPTION OF THE DRAWINGS

Figure 1:
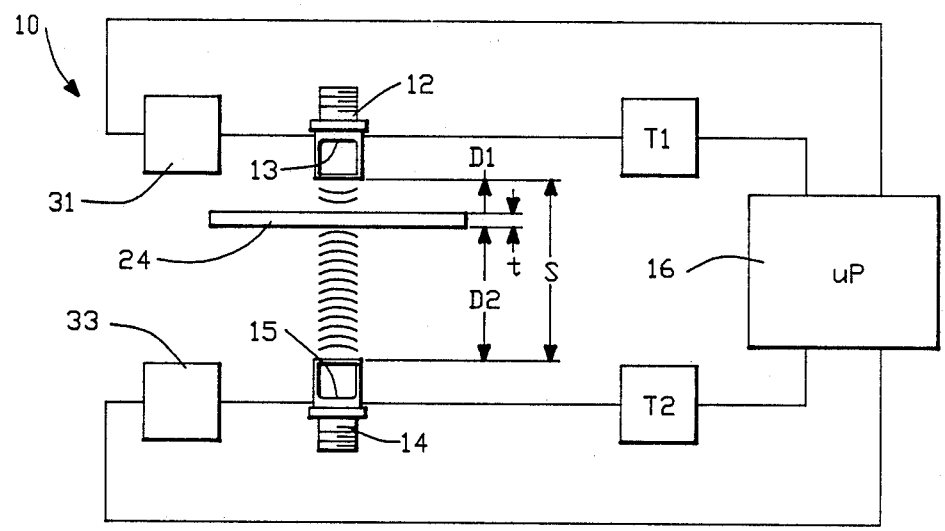
FIG. 1 is a schematic diagram of a thickness measuring system suitable for implementing the automatic calibration scheme of the present invention.

Referring first to FIG. 1, a thickness measuring system 10 (also referred to as the gauge), includes controller 16, a pair of pulse generators 31, 33, and a pair of ultrasonic probes 12, 14 located opposite each other. Each probe 12, 14 includes a sensor in the form of ultrasonic transducers 13 and 15 respectively that are adapted for generating and receiving ultrasonic signals. A target 24, the thickness of which is to be measured, may selectively be placed between the ultrasonic probes 12 and 14. Probes 12 and 14 are positioned such that the respective signals generated by each will fall upon the receiving transducers 15 and 13 of the other when no target is present. With this arrangement, when a target is passed between the two probes 12, 14, the thickness of the target (t) can be determined by measuring the distance from each of the transducers to the target (D1, D2) and subtracting their sum from the known separation between the two transducers (S). That is:

$$t = S - D1 - D2 \qquad (1)$$

To operate the system the controller 16, which may take the form of a microprocessor directs pulse generator 31 and 33 to stimulate the transducers 13 and 15 respectively. At the same time the pulses are generated, timers T1 and T2 are started. Timers T1 and T2 each measure the time required for a signal to be received by their respective transducers 13 and 15 after reflecting off of target 24. Microprocessor 16 can then calculate the distance between the each of the transducers and the target using conventional techniques. It will be appreciated that a target detection means such as a photoelectric sensor (not shown), could be used to detect the presence of a target.

Figure 2A:
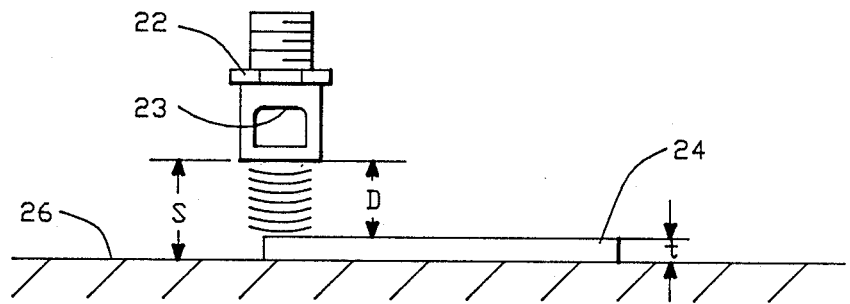
FIG. 2A is a diagrammatic side view of a distance measuring system suitable for implementing the automatic calibration scheme of the present invention.
Figure 2B:
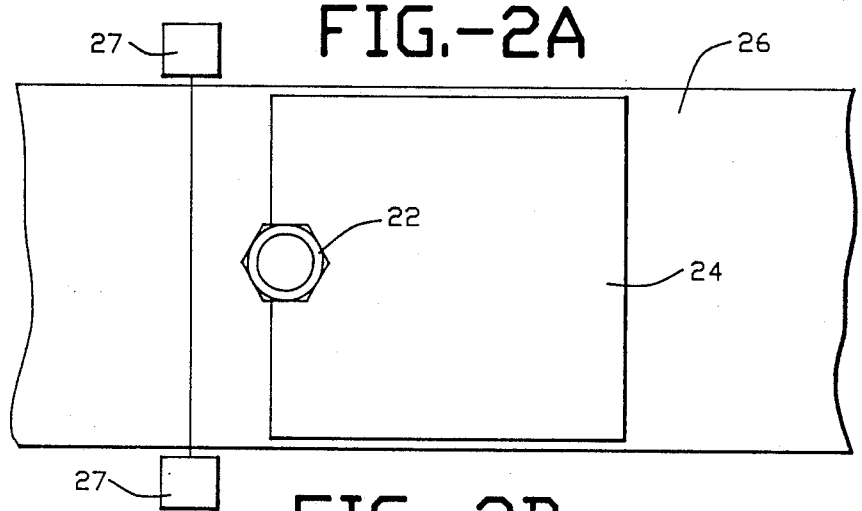
FIG. 2B is a diagrammatic top view of the distance measuring system shown in FIG. 2.

An alternative system for measuring thickness of a target is shown in FIGS. 2A & B. In this embodiment, a single ultrasonic probe 22 having transducer 23 is used to measure the thickness of a target 24 that passes by on a conveyor belt 26 that effectively prevents the target 24 from being viewed from below. A good example of a situation where a single transducer distance measuring system is used to determine the thickness of a target 24 is the thickness monitoring of ceramic tile 24 coming down an assembly line on a conveyor belt 26. It would not be practical to have a "bottom" gauge to measure the thickness of the tile because it would have to look through the conveyor belt. Instead, a single probe 22 is provided that uses the distance to the belt as a reference and then periodically samples the distance to the belt. As a tile "appears" under the probe 22, the distance to the tile is calculated and subtracted from the known distance to the belt, the difference being the thickness of the ceramic tile. A photoelectric sensor 27 may be appropriately positioned to view the area under probe 22 to verify the placement or absence of a target 24 under the gauge.

A wide variety of gauges may be used to carry out the intent of the present invention. To some degree, the most desirable gauge for a particular application will depend upon the relative distances involved, the required precision, and the anticipated shape of the target. By way of example, a gauge particularly well suited for measuring precise distances is the Model DMS1000 or TMS1000 Ultrasonic Gauges, manufactured by Ultrasonic Arrays, Inc. of Woodinville, Wash. Alternatively, a suitable system is described in copending U.S. patent application Ser. No. 828,924 which was filed on Feb. 12, 1986.

Figure 3:
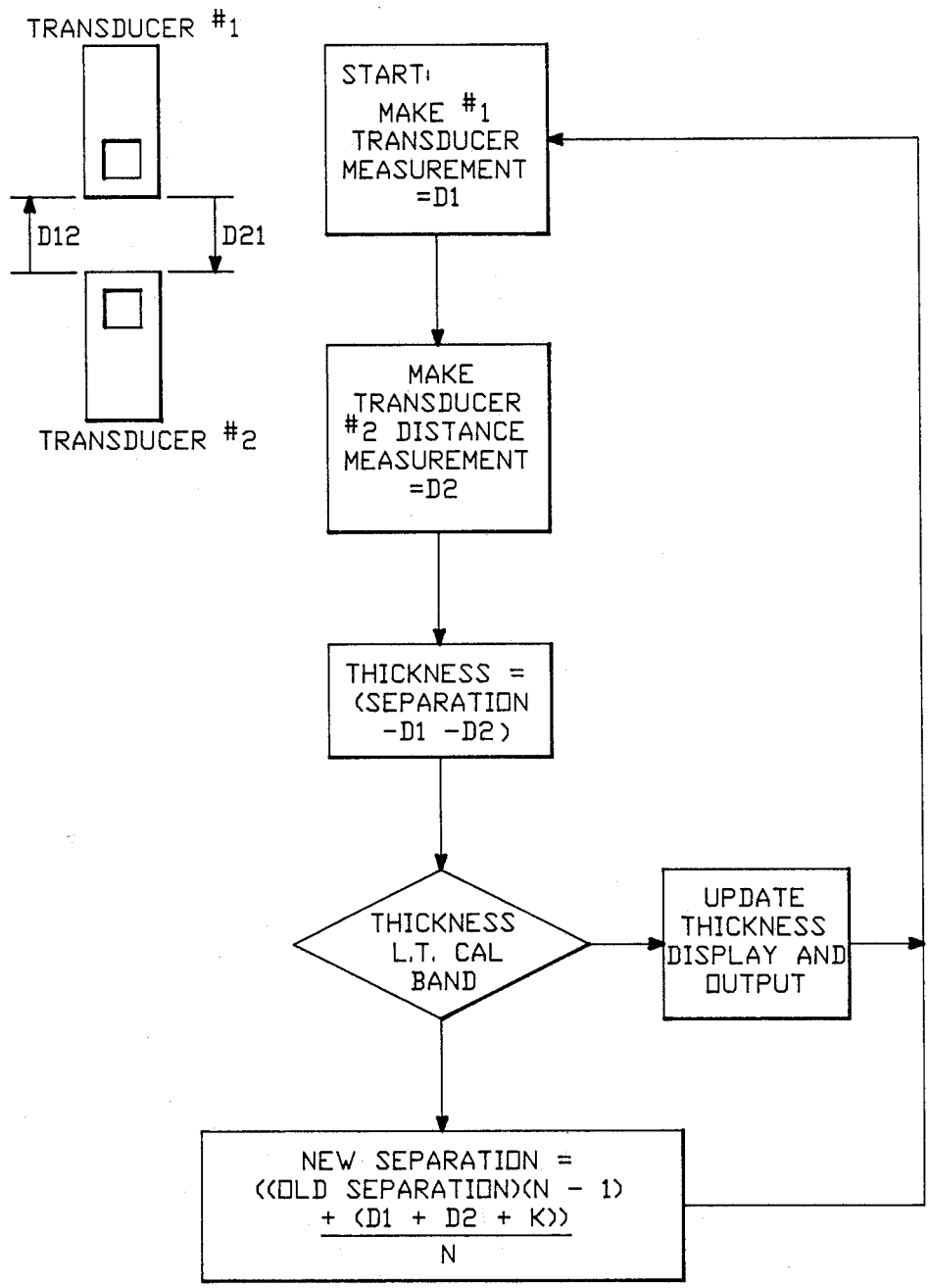
FIG. 3 is a flow diagram of an automatic calibration method in accordance with the teachings of the present invention.

Referring next to FIG. 3, the calibration scheme of the present invention will be described. The ultrasonic transducers 13, 15 provided in probes 12 and 14 are stimulated either simultaneously or sequentially to produce a pair of ultrasonic signals that are each directed towards the opposing transducer (sensor). The elapsed time between generation and reception of each signal are measured. From the travel time of each signal, the distance that the signal traveled can be determined using conventional techniques. It should be appreciated that the signal received will be a reflection off the target if a target is disposed between the sensors, while the signal received would be the signal generated by the opposing sensor if no target is present.

Once the relative distances traveled have been calculated, the thickness of the target (t) can be readily calculated by subtracting the distances the respective signals have traveled, D1 and D2 from the known separation between the sensors (S). For purposes of simplicity, all distances (such as (S) and (t)) are considered the effective round trip distance a signal would travel. Thus, the calculation of target thickness t may is calculated in accordance with equation 1.

Since movements of the sensors relative to each other are expected to be small relative to the thickness of a target, the presence of a target can be simply determined by looking at the measurement t as calculated above. If t is close to zero, then it is assumed that no target is present and the measurement is used to automatically recalibrate the distance between the gauges 12 and 14. If, on the other hand, the thickness measurement t is in the vicinity of the expected target thickness, the thickness measurement is updated and may be outputted and displayed or used for whatever purpose it is desired. The decision whether to consider the thickness measurement t a bonafide thickness measurement or an indication that no target exists will be dependent upon whether t exceeds a threshold calibration band level. By way of example, when measuring composite panels having expected thicknesses in the range of 0.375 to 2.00 inches, the threshold calibration band could be set to 0.20 inches without suffering any ambiguity. In other applications, such as when the target is printed circuit board material having a total expected thickness of 0.020 inches, the threshold calibration band would have to be set to the neighborhood of 0.008 inches or less.

It will be appreciated that there are a wide variety of alternative means for detecting the presence or absence of a target. By way of example, a photoelectric sensor could be used to detect the target's presence, or if the target displays ferromagnetic properties, an inductive oscillator arrangement could be used.

If no target is present and the measurement is to be used for calibration, the updated estimated separation between the sensors (S1) is calculated as a function of the existing (previously calculated) estimated separation (S0) and the measured distances. The updated separation (S1) is calculated as shown in equation 2.

$$S(1) = \frac{S(0)(N-1) + (D1 + D2 + K)}{N} \quad (2)$$

Wherein N is an arbitrary averaging constant that will be chosen dependant on the particular application as discussed below. K is a correction factor intended to compensate for inaccuracies caused by probes that do not precisely measure the same distance. That is, it is a correction factor that conceptually is added to D2 to ensure that D2 statistically equals D1. This factor is necessary due to the difficulty in fabricating multiple probes that all have the exact same characteristics. It should be appreciated that K would typically be very small.

As will be appreciated by those skilled in the art and those familiar with control the averaging constant N will be tied to the response of the system to a detected change in Separation (S). It is selected based upon the desired response to a change. Generally, if the changes in separation are not expected to be large and it is expected that a relatively large number of opportunities will be available for calibrating the separation as opposed to actually measuring the thickness of a target, then it would be desirable to have a relatively larger value for averaging constant N. If more pronounced changes in separation are expected, or if large time intervals will occur between calibration samples and only a few calibration samples will be available, then a relatively smaller value for averaging constant N would be desirable. By way of example, an effective value of N for most applications would be in the range of 25 to 500.

Figure 4:
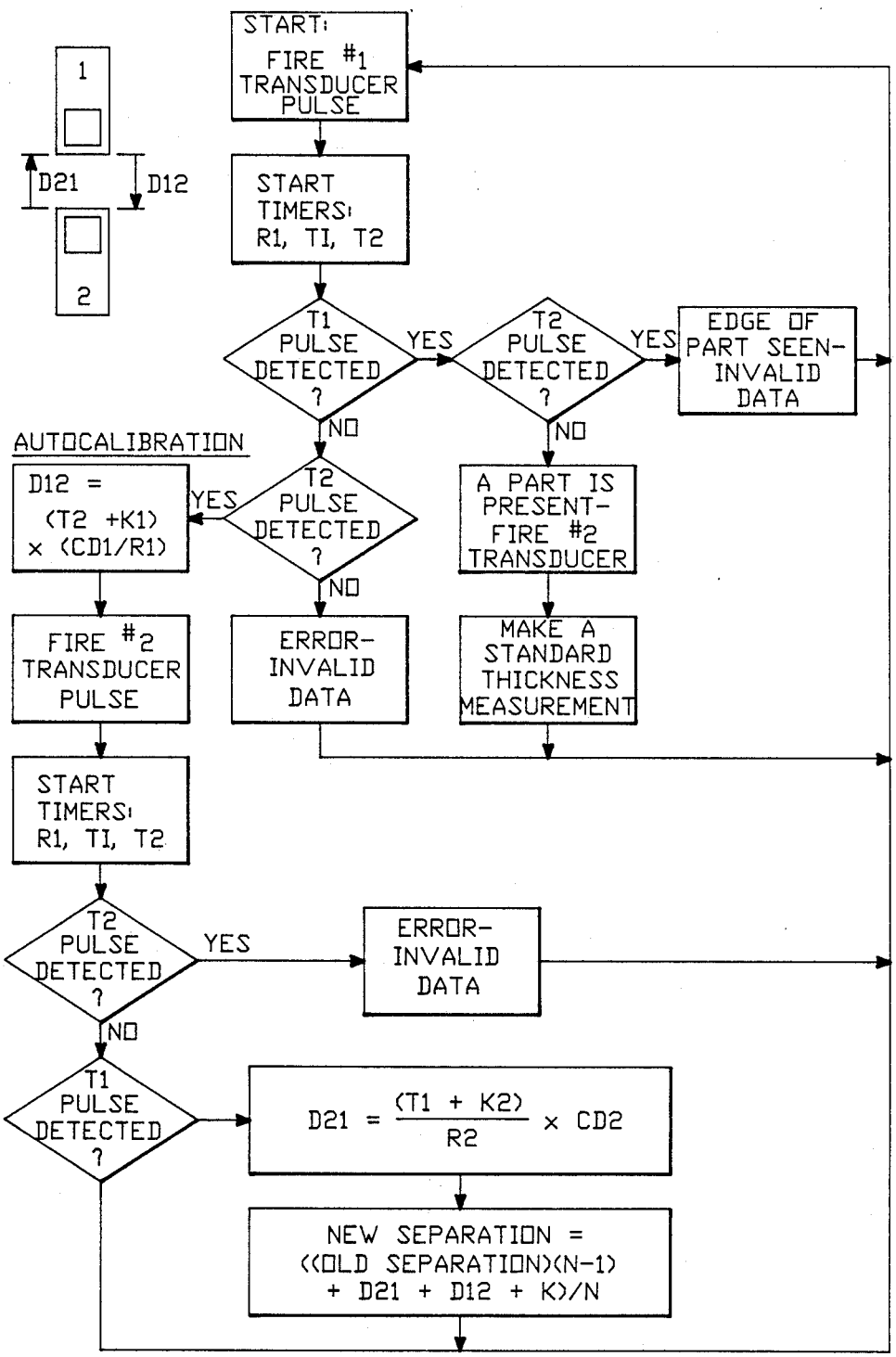
FIG. 4 is a flow diagram of an alternative embodiment of the automatic calibration method of the present invention.

It will be appreciated by those skilled in the art that a standard microprocessor based control unit may be readily used to perform the necessary calculations and timings. The flow chart shown in FIG. 4 is an expanded logic system of the embodiment shown in FIG. 3 which incorporates dual reference bar type probes as described in the aforementioned co-pending application. This embodiment also contemplates firing the transducers 13, 15 sequentially, which is particularly advantageous when measuring the thickness of extremely thin targets, and measuring the thickness of targets somewhat transparent to sound, such as foam. To operate the thickness measuring system, the first transducer 13 (located on probe 12) is fired and three timers are started simultaneously. The timers are labeled R1, T1 & T2. The R1 timer counts the time required for a signal to return from the reference bar. Timer T1 counts the time required for an echo to be reflected back to sensor 13. Timer T2 counts the time required for a signal to travel from transducer 13 to transducer 15. If a pulse is detected by transducer 13, thereby stopping timer T1, and no signal is detected by transducer 15, then a target is present. In this case, the transducer 15 in probe 14 is fired and a standard thickness measurement is made by measuring the time required for the second signal to be reflected back to transducer 15 and calculating the resultant thickness in accordance with equation 1 as previously described. In the event that both probes 12 and 14 receive the same signal, then it is presumed that the edge of a target was detected and the data is disregarded (unless the target 24 is partially transparent to sound) and the process is repeated.

If no pulse is detected by transducer 13, then transducer 15 is investigated to determine whether it has received a pulse. In the unlikely event that no signal is received by either transducer within a reasonable time, the data is invalidated and the entire sequence is begun again. If a signal is received only by transducer 15, then the calibration step is initiated since no target is present. To calibrate the distance between the transducers, the distance between the two gauges is calculated based upon the first ultrasonic signal as is shown in equation (3).

$$D12 = \frac{(T2 + K1)}{R1} \times CD1 \qquad (3)$$

Wherein, R1 is the time required for the signal to be reflected back to the transducer from a reference bar located in front of the probe itself. The reference bar is adapted for calibrating the probe 12 to compensate for changes in the ambient that affect the speed of sound such as temperature and humidity. K1 is a gauge dependent constant that essentially accounts for misalignment of the reference bar as described in co-pending patent application Ser. No. 828,924 filed Feb. 12, 1986, which is incorporated herein by reference. CD1 is a calibration constant intended to correlate the distance measured by a transducer with respect to the actual distance measured. The value of the calibration constant CD1 is entirely gauge dependent on such factors as timer accuracy and CD1 may be a fixed constant.

Additionally, after the first signal has been received, a signal is generated by the second transducer 15. Timers T1, T2 & R2 are reset and started. If for any reason, the second transducer 15 detects a reflected signal, and/or if the first transducer 13 fails to detect any signal, then the data is considered invalid and the invalid iteration is disregarded. If all works as expected, the measured distance D21 is calculated using equation 4.

$$D21 = \frac{(T1 + K2)}{R2} \times CD2 \qquad (4)$$

Once the relative distances D12 and D21 have been calculated, the updated estimate of the separation is calculated as described in the previous embodiment and shown in equation 2. It should be appreciated that D12 corresponds to D1, while D21 corresponds to D2. The measuring/calibration cycle is then repeated.

It should be apparent that the invention may be further modified to work in conjunction with a distance measuring system that calculates the thickness of an object as described with reference to FIGS. 2A & B. In such a case, there would be no need to take multiple measurements of distance. Rather, each time the transducer 23 is fired, the amount of time require for a reflection is recorded and the corresponding distance D1 of travel is calculated as previously described. The thickness (t) of the target is calculated by subtracting the recorded distance D1 from the known estimated separation S(0). As described with reference to the first disclosed embodiment, if the calculated thickness t is less than a preselected threshold calibration band level, the system recognizes that no target exists and the thickness measurement t (if non-zero) is indicative of a change in separation between the belt 26 that carries the targets 24 and gauge 22. The updated separation estimate is then calculated in accordance with equation 5.

$$S(1) = \frac{S(0)(N - 1) + D1}{N} \qquad (5)$$

Again, a microprocessor based controller 16 can be used to perform the necessary calculations, monitor the timing, and store the various time and distance measurements.

Although only a few embodiments of the present invention have been described herein, it should be understood that the present invention may be embodied in many other specific forms without departing from the spirit or scope of the invention. Particularly, it should be understood that the automatic calibration method of the present invention could be applied to any distance or thickness measuring system that is subject to movement between a sensor and a reference point that would adversely effect the accuracy of the measurements. Indeed, there are a wide variety of distance measuring systems that use mediums other than ultrasound to nonintrusively gauge a particular dimensional measurement which could employ the calibration technique of the present invention. Of course, any ultrasonic dimension measuring probe could be used as well.

Additionally, there are a wide variety of other control routines that could be used to update the estimated separation between an ultrasonic sensor and either another sensor or a reference position in accordance with the teachings of the present invention. Therefore, it will be appreciated that a wide variety of electronic controllers could be readily fashioned to implement the auto-calibration scheme of the present invention. Similarly, the present invention is not limited to the specific configurations described herein. Rather, there are a wide variety of alternative mounting techniques that could be used as well. For example, a pair of sensors could be mounted on opposite plates in an unaligned relation. With such an arrangement, the thickness of a target probed between the sensors can be measured as described, while the separation calculations would be based upon the distance between each sensor and its opposing plate off of which the signals are reflected in the absence of a target. Therefore, the present examples and embodiments are to be considered as illustrative and not restrictive, and the invention is not to be limited to the details given herein, but may be modified within the scope of the appended claims.

We claim:

1. A method for automatically calibrating a thickness measurement system while the system is in use, the system including at least one distance measuring probe, the method comprising the steps of:
   periodically generating signals directed towards a reference region through which a target may be passed;
   measuring the time period that elapses between generation of each particular signal and reception of the particular signal at a designated location there being an estimated separation indicative of the distance the particular signal must travel between generation and reception in the absence of a target;
   determining whether the target is present based in part upon the time period measurement;
   whereby if a target is present, the time period measurement is used in conjunction with the estimated separation to calculate the thickness of the target; and
   whereby if no target is present, the time period measurement is used to update the estimated separation.

2. A method for automatically calibrating a thickness measuring system while the system is in use, the system including two ultrasonic probes each having a transducer thereon for generating ultrasonic signals, wherein targets are periodically passed between the sensors to measure the thickness of the target, there being an estimated separation between the probes, the method comprising the steps of:
   emitting a first ultrasonic signal from a first one of the probes;
   receiving the first ultrasonic signal by one of the probes;
   measuring a first time delay as the time lapse between generation and reception of the first signal;
   determining whether a target is present between the first and second probes;
   whereby if no target is present, the first time delay measurement is used to automatically update the estimated separation between the first and second probes and whereby if a target is present, the first time delay measurement and the estimated separation are used to automatically calculate the thickness of the target.

3. A method is recited in claim 2 further comprising the steps of:
   emitting a second ultrasonic signal from the second probe,
   measuring a second time delay as the time lapse between generation and reception of the second signal by one of said probes, and
   whereby if a target is present, the second time delay measurement is also used to calculate the thickness of the target.

4. A method as recited in claim 3 wherein if no target is present, the second time delay measurement is also used to update the estimated separation between the first and second probes.

5. A method as recited in claim 4 wherein when no target is present, the second probe receives the first ultrasonic signal and the first probe receives the second ultrasonic signal.

6. A method as recited in claim 5 wherein the first and second ultrasonic signals are emitted substantially simultaneously.

7. A method as recited in claim 6 wherein the distance traveled by the first signal is calculated using the first time delay measurement and the distance traveled by the second signal is calculated using the second time delay measurement.

8. A method as recited in claim 4 wherein when no target is present, the first ultrasonic signal is received by the first probe after reflecting off of the second probe.

9. A method as recited in claim 8 wherein the distance traveled by the first signal is calculated using the first time delay measurement and the distance traveled by the second signal is calculated using the second time delay measurement and the updated estimated separation is calculated by:
   multiplying the existing estimated separation by an averaging constant to create a first value;
   adding the distances traveled by the first and second signals to the first value to produce a second value; and
   dividing the second value by a number that is one more than the averaging constant.

10. A method as recited in claim 9 wherein the determination of whether a target is present is based upon which transducer receives the first signal, whereby if the first signal is received by only the second transducer then no target is present, and if the first signal is received by only the first transducer than a target is present.

11. A method as recited in claim 3 whereby an updated estimated separation is calculated as a function of an existing estimated separation and the first and second time delays.

12. A method as recited in claim 2 wherein said target presence determining step is based on subtracting a calculated distance traveled from an existing estimated separation, wherein if the difference is less than a threshold level, it is determined that no target is present.

13. A method as recited in claim 2 wherein a photoelectric sensor is used to determine the presence of the target.

14. A method for automatically calibrating a distance measuring system while the system is in use, the system having an ultrasonic probe for measuring the thickness of a target that passes over a reference position, there being an estimated separation between the probe and the reference position the method comprising the steps of:
   periodically generating ultrasonic signals and directing the signals towards the reference position;
   receiving each particular ultrasonic signal after it has been reflected by either the target or the reference position;
   measuring the time lapse between generation and reception of each particular signal;
   determining whether a valid reflection signal is received and for each valid reelection signal received, whether the particular valid reflection signal is reflected off of the target or the reference locating; and
   whereby if a particular valid reflection signal is reflected off of the reference location, the associated time lapse measurement is used to update the estimated separation between the probe and the reference position and whereby if a particular valid reflection signal is reflected off of the target, the associated time lapse measurement is used together with the estimated separation to calculate the thickness of the target.

15. A method as recited in claim 14 wherein the measured time lapse is used to calculate the distance traveled by the signal and wherein when a target is present, the calculated distance traveled by the signal is subtracted from the existing estimated separation to calculate the thickness of the target.

16. A method as recited in claim 15 whereby the updated estimated separation is calculated as a function of the existing estimated separation and the calculated distance traveled by the signal.

17. A method as recited in claim 16 wherein the updated estimated separation is calculated by:
  multiplying the existing estimated separation by an averaging constant to create a first value;
  adding the calculated distance traveled by the signal to the first value to produce a second value; and
  dividing the second value by a number that is one more than the averaging constant.

18. A method as recited in claim 15 wherein said target presence determining step is based on subtracting the calculated distance traveled from the existing estimated separation, wherein if the difference is less than a threshold level, it is determined that no target is present.

19. A method as recited in claim 14 wherein a photoelectric sensor is used to determine the presence of the target.

20. An apparatus for measuring the thickness of a target in a system having a reference location, the apparatus comprising:
  at least one distance measuring probe having a transducer for generating ultrasonic signals in the direction of the reference location positioned a known distance away;
  timer means for measuring the time it takes for each one of the ultrasonic signals to be received; and
  computing means for calculating the distance traveled by the signals, the thickness of the target and the separation between the probe and the reference location based in part on the time measurements made by said timer means, wherein said computing mean records an estimated separation between the probe and the reference location;
  detection means for determining whether a target is present, wherein if a target is present, the computer means calculates the thickness of the target based in part upon the time measurement made by said timer means and in part upon the estimated separation, and wherein if no target is present the computing means calculates an updated estimated separation between the probe and the reference location.

* * * * *